(12) United States Patent
Higham et al.

(10) Patent No.: US 10,679,021 B2
(45) Date of Patent: *Jun. 9, 2020

(54) INVENTORY MANAGEMENT SYSTEM

(71) Applicant: Cubex LLC, Phoenix, AZ (US)

(72) Inventors: John D. Higham, Menlo Park, CA (US); Anton Visser, Newport Beach, CA (US)

(73) Assignee: Cubex LLC, Phoenix, AZ (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/878,941

(22) Filed: Jan. 24, 2018

(65) Prior Publication Data
US 2018/0150659 A1    May 31, 2018

Related U.S. Application Data

(63) Continuation of application No. 15/240,914, filed on Aug. 18, 2016, now Pat. No. 9,886,605.

(60) Provisional application No. 62/218,301, filed on Sep. 14, 2015.

(51) Int. Cl.
| | |
|---|---|
| *G06Q 30/00* | (2012.01) |
| *G06K 7/10* | (2006.01) |
| *G06Q 10/08* | (2012.01) |
| *G06K 7/14* | (2006.01) |

(52) U.S. Cl.
CPC ....... *G06K 7/10297* (2013.01); *G06K 7/1417* (2013.01); *G06Q 10/087* (2013.01)

(58) Field of Classification Search
CPC ..... G06F 19/322; G06F 8/65; G06Q 20/3278; G06Q 20/32
USPC .......................................... 235/375, 380, 385
See application file for complete search history.

(56) References Cited

U.S. PATENT DOCUMENTS

| | | |
|---|---|---|
| 9,886,605 B2 | 2/2018 | Higham et al. |
| 2009/0224039 A1 | 9/2009 | Hause et al. |
| 2011/0016026 A1 | 1/2011 | Godlewski |
| 2014/0210276 A1 | 7/2014 | Shinoda et al. |
| 2014/0310791 A1 | 10/2014 | Dhand et al. |
| 2014/0350711 A1 | 11/2014 | Gopalakrishnan et al. |
| 2017/0076119 A1 | 3/2017 | Higham et al. |

FOREIGN PATENT DOCUMENTS

WO    WO 2017/048454    3/2017

*Primary Examiner* — Jamara A Franklin
(74) *Attorney, Agent, or Firm* — Levine Bagade Han LLP

(57) ABSTRACT

An inventory management system for managing multiple inventory items by multiple users is described and generally includes one or more button modules each having at least a first button and a second button and an NFC chip incorporated into the button module. Each NFC chip has a predetermined and unique module identification signal associated with the button module. The button module may further include a circuitry unit configured to receive a predetermined and unique mobile device identification signal from a mobile device for combination with the module identification signal from the NFC chip. The circuitry unit may receive a count signal indicative of an increase or decrease in inventory count corresponding to the first button or the second button being depressed upon the button module and combine the count signal with the mobile device identification signal and module identification signal for transmission to a remote server.

25 Claims, 6 Drawing Sheets

US 10,679,021 B2

INVENTORY MANAGEMENT SYSTEM

CROSS-REFERENCE TO RELATED APPLICATIONS

This application is a continuation of U.S. patent application Ser. No. 15/240,914 filed Aug. 18, 2016 (now U.S. Pat. 9,886,605), which claims the benefit of priority to U.S. Prov. App. 62/218,301 filed Sep. 14, 2015, each of which is incorporated herein by reference in its entirety.

FIELD OF THE INVENTION

The present invention relates to inventory management systems used to track the quantity of items taken or replaced from the inventory. More specifically, the present invention relates to inventory manage systems which can be used to wirelessly record multiple inventory items using one or more button modules.

BACKGROUND OF THE INVENTION

The computer management of perpetual inventory is a common process today. There are many methods for tracking who takes, returns or restocks items in a store room or warehouse in order to maintain a record of the on-hand quantity, and to monitor that quantity in order to place orders to replenish stock. A typical system comprises a computer with a database storing information about each item, and means for users to interact with that database, to maintain a computer based numerical representation of what is actually physically on the shelves. The maintenance of the information in the computer can be as simple as requiring a user interacting with the inventory, to subsequently go to a nearby computer terminal, and input information about what they did. For busy stock rooms, and particularly large warehouses, having a fixed terminal entry requiring multiple users to remember or note down what they did at multiple item locations, and return to a fixed location to enter data into a computer terminal, is at best inconvenient, and at worst will be a process that users are unlikely to consistently follow. The same is true of a supervisor's maintenance functions, such as assigning or de-assigning an item to a location, entering the maximum and minimum levels required, and performing routine check functions such as Physical inventory counting (a.k.a. Cycle Counting). All these operations need to be done at the location where the item is located on a shelf or in a bin, physically remote from any fixed computer terminal(s).

There are a number of ways in which the problem of multiple users taking and returning items, and supervisors maintaining items, have been solved when the item locations are remote from a computer terminal. One has been to use portable intelligent bar code scanners that communicate with the base computer and where information can be entered on the scanner screens. One of the issues with this method is that portable devices have a tendency to get stolen or mislaid. Another is such devices are expensive and require special programming and maintenance. An alternative method is described here using wirelessly connected button modules, and the invention described is intended provide improvements on this method.

SUMMARY OF THE INVENTION

The invention relates to wireless-connected button modules, one semi-permanently located at each item shelf location, and each button module able to transmit wireless signals to a base station. Generally, a system for managing multiple inventory items by multiple users may comprise a button module having at least a first button and a second button and an NFC chip incorporated into the button module, wherein the NFC chip has a predetermined and unique module identification signal associated with the button module and where the NFC chip is configured to activate when a mobile device is in proximity to the button module. The button module may further include a circuitry unit in communication with the NFC chip, wherein the circuitry unit is configured to receive a predetermined and unique mobile device identification signal from the mobile device for combination with the module identification signal from the NFC chip, wherein the circuitry unit is further configured to receive a count signal indicative of an increase or decrease in inventory count corresponding to the first button or the second button being depressed upon the button module and combine the count signal with the mobile device identification signal and module identification signal for transmission to a remote server.

In use, one method for recording multiple inventory items by one or more users may generally comprise receiving a wireless signal from a mobile device in proximity to a NFC chip incorporated into a button module, wherein the mobile device has a predetermined and unique first identification signal and the NFC chip has a predetermined and unique second identification signal associated with the button module, transmitting to the remote server via the button module, a combination of the first identification signal from the mobile device, the second identification signal from the NFC chip, and a third signal indicative of an increase or decrease in inventory count, wherein the combination of signals is transmitted from the button module when a first button corresponding to the increase or a second button corresponding to the decrease is depressed by a user upon the button module.

Each button module comprises a housing with typically two buttons, e.g., one a "Take" button and the other a "Return" button. Inside each button module is a wireless transmitter and battery, and the pushing of either the Take or the Return button generates a wireless signal indicating that action, together with an ID, unique to that button module. The wireless base station receiving these one-way signals from multiple button modules arrayed throughout the storage area, is connected to the computer that is maintaining the perpetual inventory, and using that unique ID which has been previously associated with the particular item stored at that location (a process known as "assignment"), the computer can adjust the inventory up or down for that item, one increment for each button push. This solves the convenience issue for a single user taking/returning multiple items. Once logged into the system, that user can walk around the stock room and simply record that they removed or replaced items by pushing the take/return buttons a corresponding number of times, maintaining an accurate record of inventory in the data base. This is preferable to having to note down what was taken/returned at each location and returning to the computer screen to enter that data after the fact.

Even requiring a user to push a button a number of times to indicate the exact number of items taken or returned, cannot be guaranteed to be accurate over time. It is prone at best to human error, or to laziness, or at worst, a deliberate attempt to take items without recording that action. However more secure automated ways of dispensing or delivering one item at a time in a secure automated manner is orders of magnitude more expensive. Consequently many inventory systems rely on the human operator to honestly and accurately manually record what they have done. The objective of the button module is to make the recording of the Take/Return as convenient, easy and error free as possible.

The objective of the invention is to augment the use of the button module to allow multiple simultaneous users and to increase the ease of use of supervisory functions One of the issues with that button module method as described so far, is that the identification of the user performing the take/return action is based on that user logging into the computer system. This means that only one user can be active at a time. In that circumstance the current versions of the button modules cannot distinguish between users. This is a serious restriction in a large warehouse where you would want many users operating simultaneously. One of the purposes of this invention is to solve this issue by identifying the user when they activate the button. This is achieved by having, e.g., a Near Field Communication (NFC) chip in each button module that is activated by the user's mobile device, either a cell phone or tablet computer, and receive the identity of that activating device. When the user subsequently presses a button, the button module is able to also transmit that user's identification back to the computer along with the item ID and the quantity taken/returned, allowing the central computer to distinguish between the actions of multiple users.

While much of the activity in a warehouse is having users take and return items, there are also supervisory functions that need to be performed. Included in these activities are assigning and de-assigning items to a location and its associated button module, determining the Maximum fill level (also known as the "Par" level) and Minimum level (also known as the re-order point) and Emergency low level (also known as Critical level). Also for performing the function of taking physical inventory and entering actual inventory levels which, over time, may not be what is reflected in the computer database due to users who might not have always recorded accurately the quantity they had taken/returned. In order to achieve these supervisory functions, the user may use a mobile device that gives them access, either through a Wi-Fi or a cellular connection, to the database for the many items in the warehouse. At each inventory location the user has to accurately look up and identify the database item corresponding to the item they are dealing with. Consequently another purpose of this invention is to establish that connection between the item location and the correct item in the database, automatically. The user establishes a connection between their NFC enabled mobile device, whether it be a cell phone or tablet, and the NFC chip in the button module, by placing the mobile device in close proximity to the button module, typically by tapping the device on the button module. This allows the mobile device to access information about that unique location in the master database enabling the supervisor to assign/de-assign items, modify the maximum or minimum re-order levels, and perform and enter physical inventory counts and other adjustments.

DETAILED DESCRIPTION OF THE INVENTION

Figure 1:
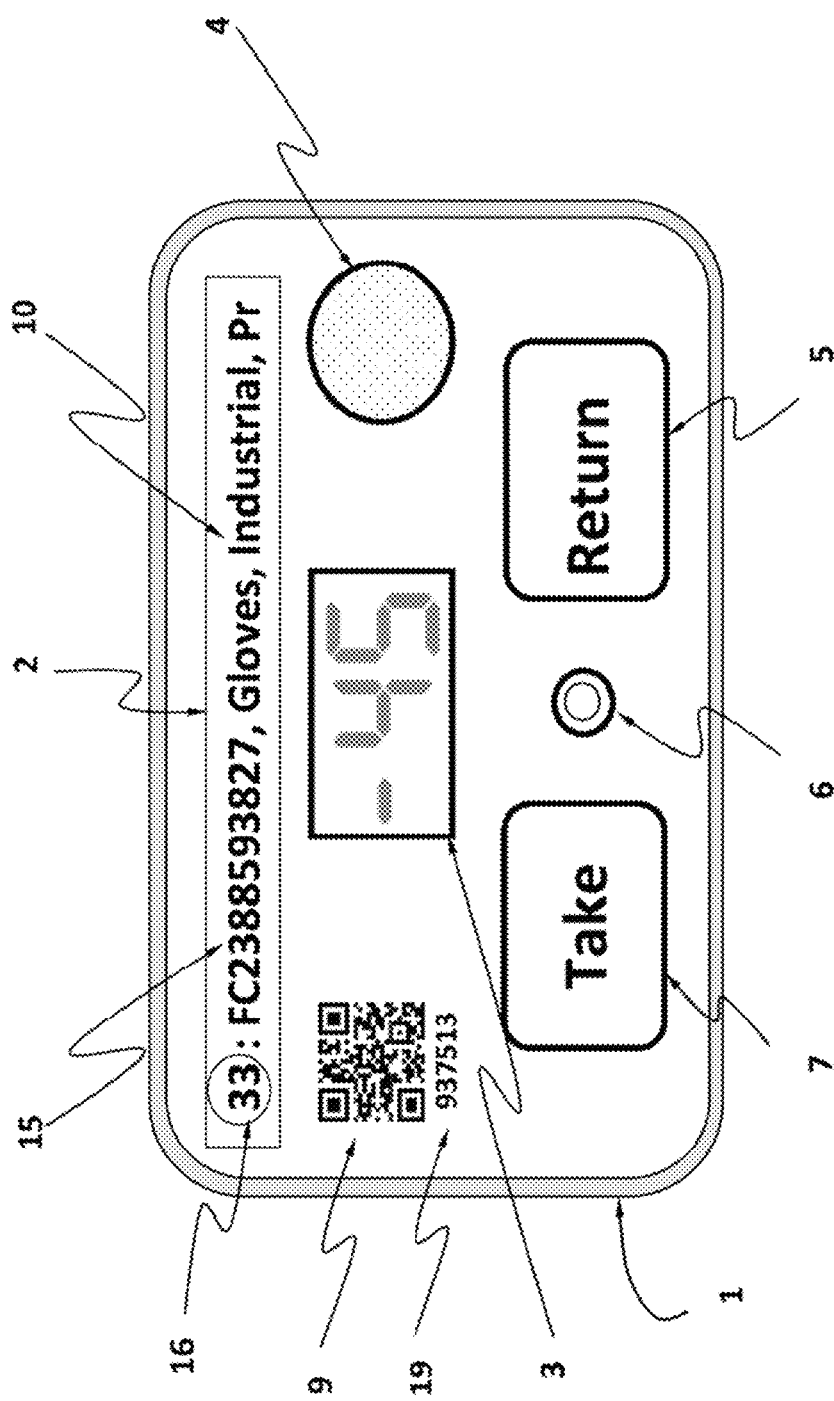
FIG. 1 shows an example of the features of the front view of a wireless-connected button module one of each of which are affixed to each inventory shelf location or inventory bin

FIG. 1 shows an example of the elements of the front of a button module. It comprises a housing 1, which may be affixed, secured, attached, or otherwise positioned at any number of locations. On the front of the button module are one or more buttons, typically a Take 7 and a Return 5 button. There may also be affixed a label 2 that contains the item description 10, and usually the item ID 15 (e.g., inventory number) of the item that has been assigned at that location, and optionally, a unique short number 16 assigned by the computer when the label is printed, that is associated in the database to the unique (and unchanging) ID 19 of the button module itself, which number is part of the wireless transmission from the button module. This unique short number 16 can be used as a reference to the item and its location, when the user is looking up information in a user interface, and can be used to retrieve and enter information about that item, with a very quick 2 or 3 digit entry, saving the user from entering the longer item ID 15 or the not-necessarily unique item description 10 since the item that is associated with the button module (e.g., at the time of assignment and re-printing the unique short number 16) may change.

Optionally a light indicator 6 may be provided on the button module, and an auditory signaling device 4, e.g., a speaker, may also be provided to give a visual and/or auditory indicator as confirmation as to when the button (Take 7 or Return 5) is depressed. Each button module can be assigned a unique ID number and this can be displayed 16, and/or presented as a 1D or 2D barcode 9. Also optionally an LCD numeric display 3 can be provided to visually display the number of items taken/returned by the user. This increases cost and is unnecessary if the typical use is to take or return one or two items. But if larger quantities are frequently taken, this allows a user to check that they have pressed the Take or Return button the correct number of times.

Figure 2:
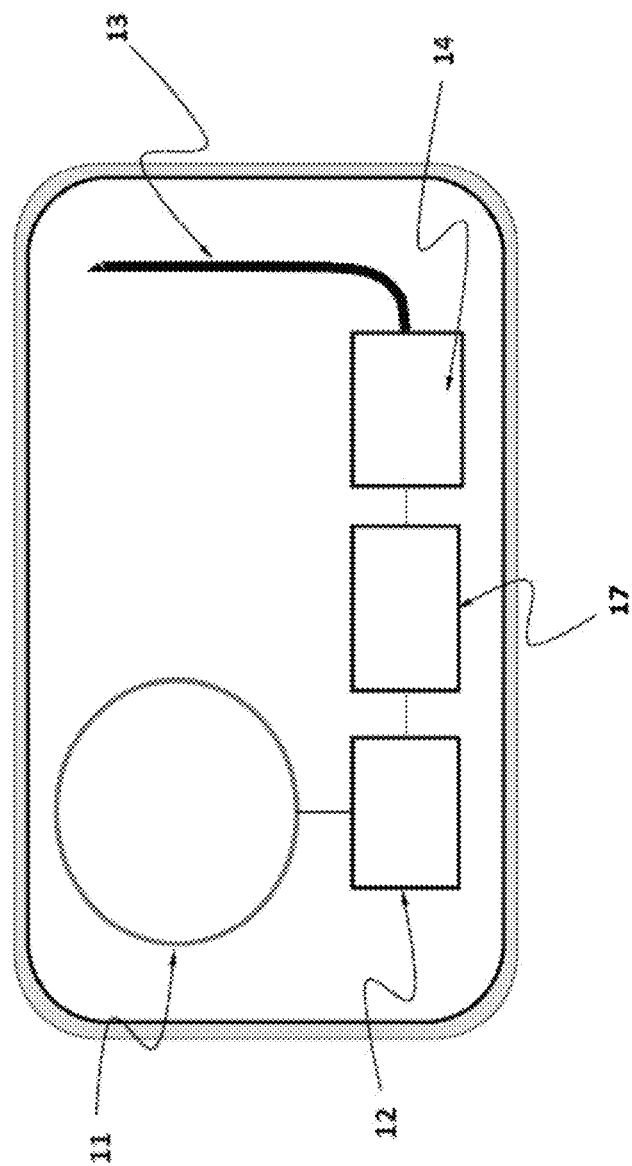
FIG. 2 shows an example of the features of the interior of a wireless-connected button module one of each of which are affixed to each inventory shelf location or inventory bin

FIG. 2 shows an example of some of the elements of the internal components of the button module which contains inside, e.g., a battery 11, wireless transmitter 14 and antenna 13, circuitry 17 and an active or passive RFID (Radio Frequency Identification) chip 12. The circuitry 17 may generally comprise an electronics assembly including, e.g., a microprocessor, which may be programmed to receive signals from the chip 12 as well as signals from a mobile device, e.g., phone, smartphone, tablet, etc. (as described in further detail below). To save on battery 11 consumption, the button module's circuitry may remain off until either a user pushes a button, or the NFC chip 12 is energized by a remote mobile device. If a button 7 or 5 is pushed, circuitry 17 and 14 is switched on drawing current from the battery for a short period, long enough to send a wireless signal containing information regarding the (unchanging) ID number of the button module, which button was pushed (Take or Return) and, if the NFC has been energized by an external mobile device, the ID of that external device. Optionally, the light 6 may briefly illuminate to indicate acknowledgement of a button push. Similarly and optionally, the auditory signaling device 4, typically a low current piezo device, may be energized to emit an audible beep to indicate to the user that a button push has been recognized by the circuitry. Both these actions are momentary to minimize drain on the battery. Where an LCD display 3 is used, it would display the net take and return button pushes during the session. In the case of having an LCD display or received the user's identification, this information is retained during the session and for a short period of inactivity (at the buttons), e.g., typically set to 5-10 seconds.

Figure 3:
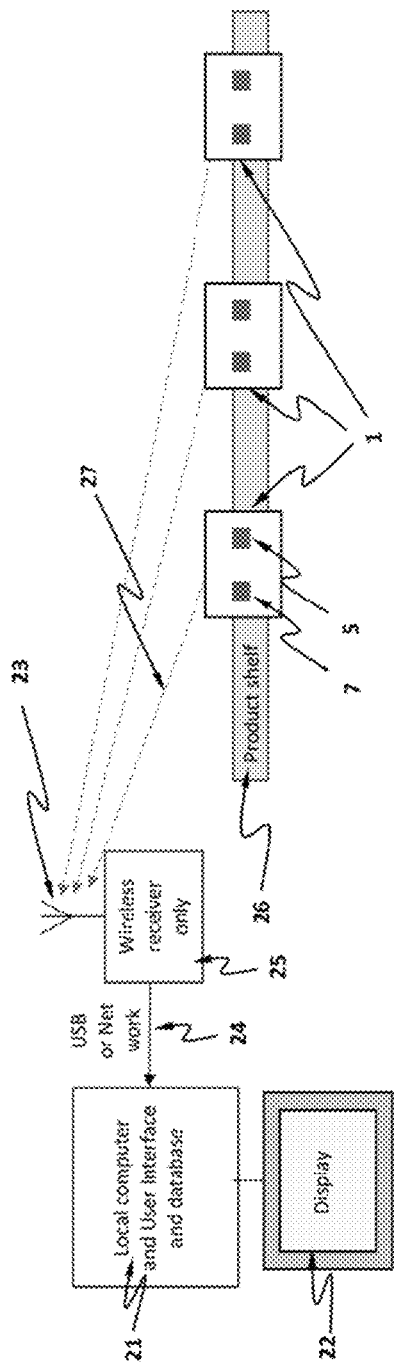
FIG. 3 shows an example of the elements of a computer based inventory system using multiple button modules attached to each inventory location, and a single computer terminal in a store room or warehouse

FIG. 3 shows schematically an example of the basic operation of the system without the benefit of the use of the button module for contrast, for a user taking and returning items. A local computer 21 with database containing information about the items, is located in the warehouse and can be operated from an attached display screen and data entry keyboard 22. A wireless receiver 25 is connected to that database, typically through a USB or network connection 24. In the warehouse, multiple button modules 1 are mounted on product shelving 26 throughout the warehouse. When a Take 7 or Return button 5 is activated, a one-way wireless signal 27 is sent to the wireless receiver 25 along with the unique ID 19 of the button module and so the information gets entered into the database 21.

Figure 4:
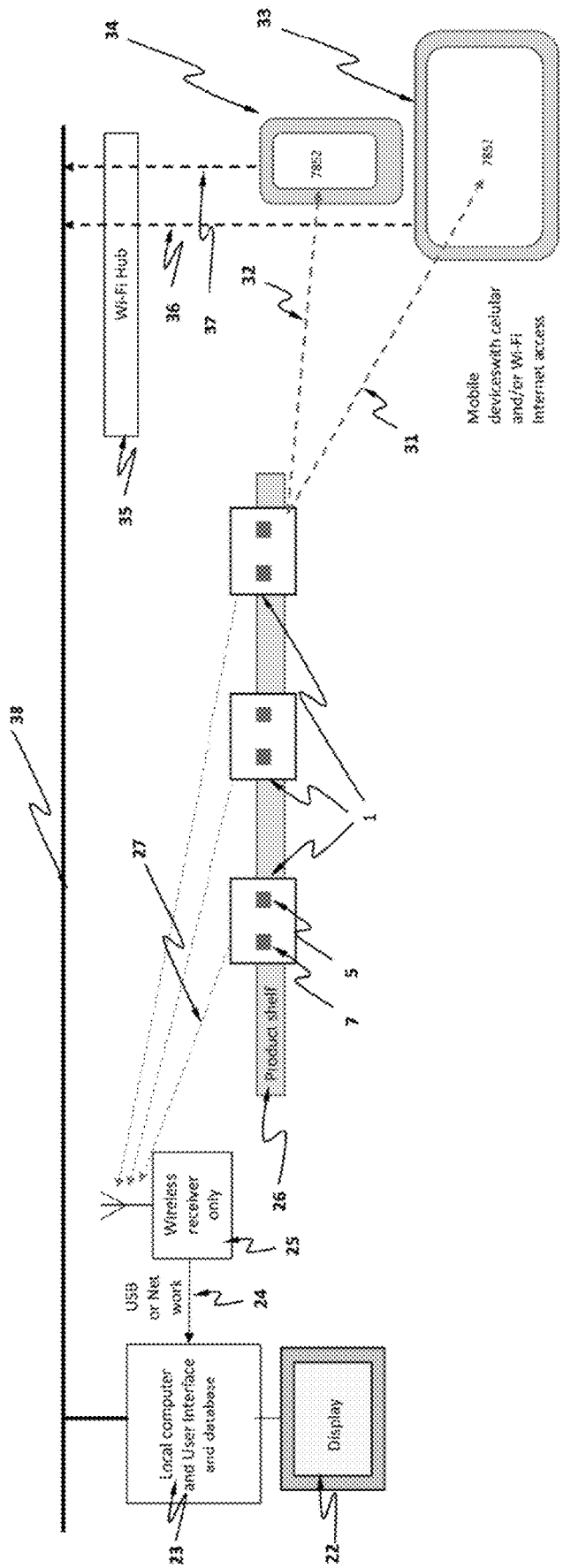
FIG. 4 shows an example of the elements of a computer based inventory system using multiple button modules attached to each inventory location, and a computer terminal in a warehouse where a mobile device such as a cellphone or a tablet is connected via a Wi-Fi network to the database representing a record of the inventory items in the warehouse, and associated data. By identifying an inventory location on the mobile device the user can retrieve information about, and enter information regarding, that location into the database.

FIG. 4 shows the system of FIG. 3 where a supervisor has access to the database at the item location, through a mobile device, typically a phone 34 (such as a smartphone) connected via Wi-Fi 37 (or other wireless protocol) to a network 38, or a tablet 33 also connected via Wi-Fi 36 (or other wireless protocol) to a network 38, and hence to the database 23.

Figure 5:
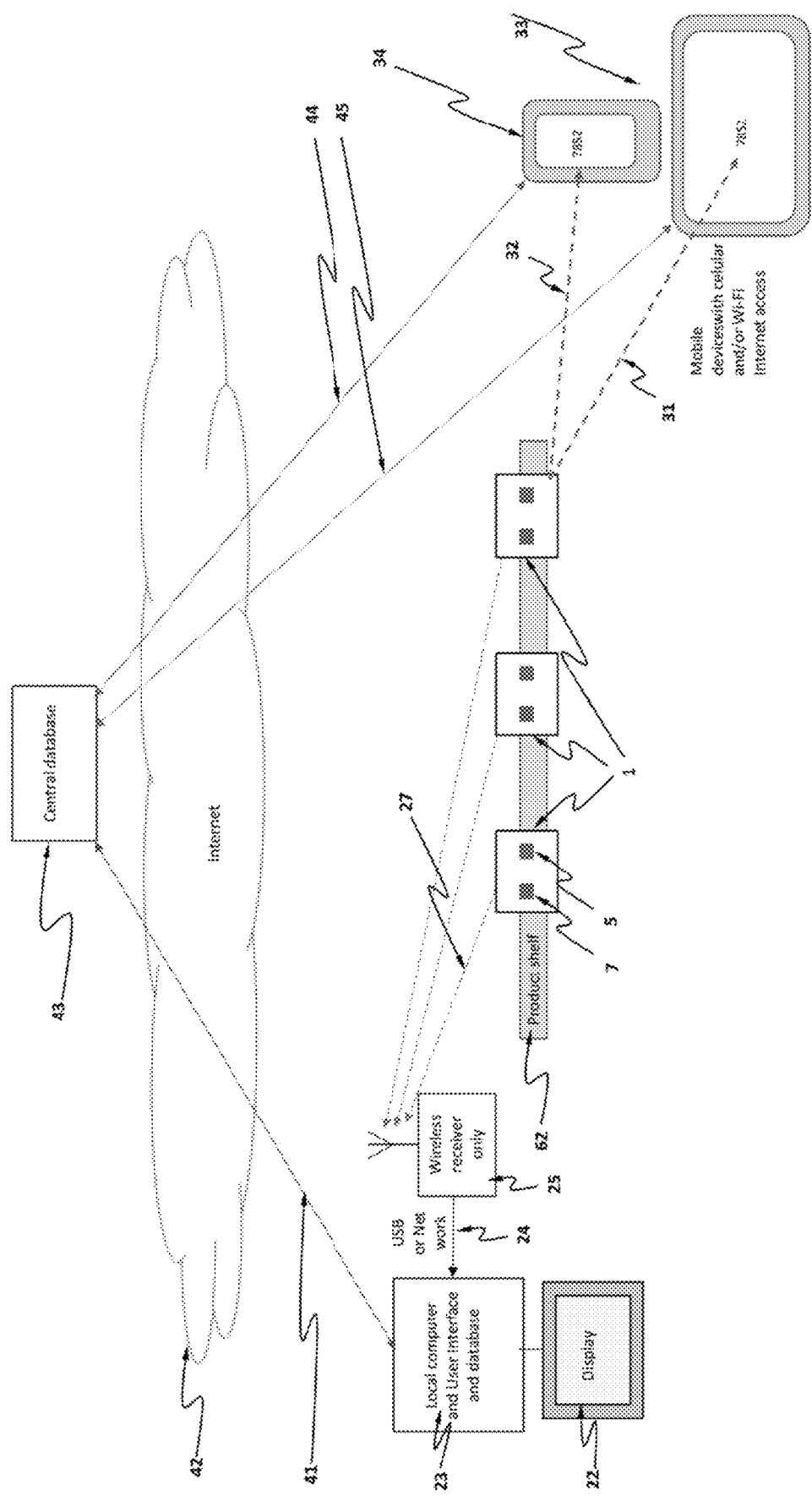
FIG. 5 is the same as FIG. 3 except the communication path to the data base is through the internet, by Wi-Fi or Cellular connectivity.

FIG. 5 shows the system of FIG. 4 where the access by the supervisor to the data base is via the internet 42. A copy of the data in the local database 23, is maintained in an internet accessible database 43. Alternatively the database 43 is the single database and there is no local database at location 23. Rather that the computer at location 23 passes the information received wirelessly from the button modules 1 immediately to the database 43 over the internet 42. A supervisor has access through a mobile device, typically a phone 34 (such as a smartphone) connected through an internet connection 44 to the main database 43, or a tablet 33 connected through an internet connection 45 to the main database 43.

Regardless of whether the communication of the mobile device 33 or 34 is via the local network or over the internet, the user in FIG. 4. or FIG. 5. needs to enter information 31 or 32, about the item to the mobile device to bring up information about this item and location. This can be done by entering, e.g., the item ID 15, on that label from the label 2 on the button module shown in FIG. 1. Item IDs are typically lengthy and that entry process is tedious and prone to error. However, the advantage of entering an ID or description is that the access on the mobile device can be via a web browser without a specific application needing to be downloaded to the device. A third alternative is to enter a short number 16, unique to just that site, associated in the database with the unique and unchanging ID of the button module itself 19, shown in FIG. 1. This associated number 16 has been previously associated with the item in the database, and is shorter, being two or three digits in a typical warehouse with less than 1,000 items.

All these methods requiring data entry though, are an extra step, and prone to error. An automated way would be to obtain the unique ID of the button module by having the mobile device scan a 1D or 2D bar code 9 of that number 19, FIG. 1. This requires some custom application software on the mobile device to receive this information from the mobile device hardware, and get it entered into the database. Also, using this method, while the supervisor gets entry-free identification of their item, removing the labor and errors in entering a description or item ID manually, this does not solve the other issue of identifying users who are taking and returning items.

Figure 6:
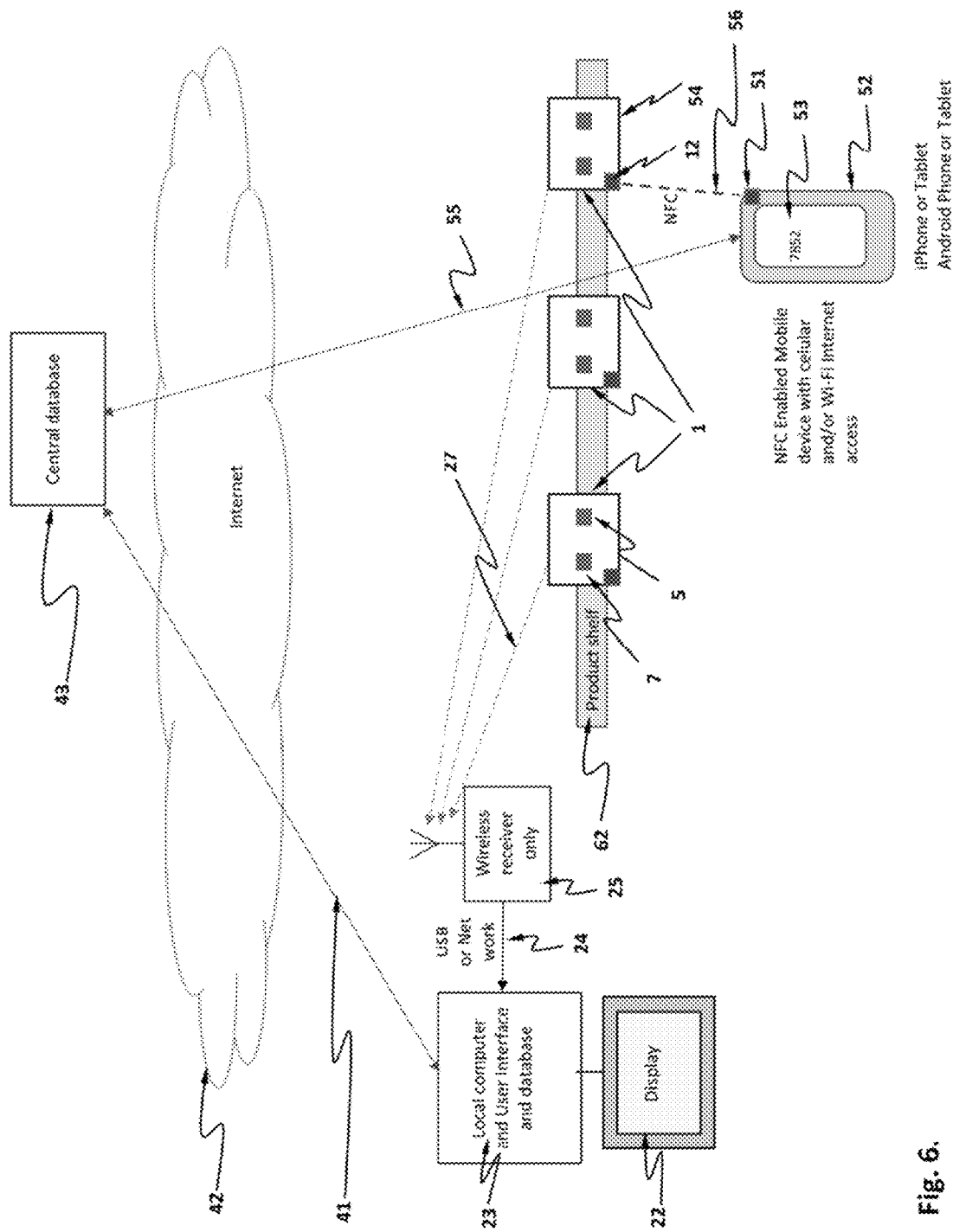
FIG. 6 shows the system of FIG. 5 where the button module is identified to the mobile device by having a passive RFID chip activated by a proximate mobile device, allowing the user of the mobile device to have information related to the item associated with that button module be accurately and immediately displayed on the mobile device. Separately if a button on the button module is pushed, this activates circuitry in the button module that reads the unique identification of the mobile device allowing inventory actions related to the item location, such as pushing a button multiple times to indicate the number of items taken, be transmitted wirelessly to the warehouse computer together with the identity of the user who took the items, by association with that user's personal or company issued mobile device.

FIG. 6 shows a mobile device 52 like in FIG. 4, but the mobile device is NFC enabled 51, allowing it to communicate with a passive or active NFC chip 12 in the button module 1. On bringing the mobile device 52 close a specific button module 54, and its associated NFC chip 12, the mobile device communicates its unique ID 53 to the button module 1. In that way, any actions the user makes on the button module that get transmitted wirelessly 27, will also contain the ID 53 of the user's mobile device. Similarly, if a supervisor needs to access information via the internet connection 55 from the database 43, it will be able to immediately look up the item because it has received the button module ID via the NFC connection 56. The energization of the NFC chip is likely to be momentary, typically by touching the mobile device to the button module 1 then withdrawing it. The circuitry 17 within the button module 1 may include, e.g., a microprocessor, as described in further detail herein. This circuitry 17 may receive the ID 53 of the user's mobile device as well as the identifying information from the NFC chip 12. As the Take 7 and/or Return 5 buttons on the button module 1 are depressed, an additional signal indicating the taking or returning of inventory may also be generated and combined by the circuitry 17 for wireless transmission from the button module 1 to the wireless receiver 25.

The NFC variety of RFID chip family is chosen specifically because the energizing range is a few centimeters. It is desirable to keep that range short, so as not to inadvertently energize several button modules in the vicinity of that user, in case it may change the user ID for other users nearby. Energizing the NFC chip 12, inside the button module switches on the battery and circuitry which will retain the identification of the energizing mobile device, even when that device has been withdrawn. This identification is kept in the circuitry to be sent with button push event information wirelessly to the computer. After the circuitry has been switched on, either by an external mobile device energizing the NFC chip, or by a button push, then after a period of inactivity, defined by the absence of an external mobile device's energy signal and/or the absence of any further button pushes, the device will switch itself off in order to preserve battery life. This is typically, e.g., about 5-10 seconds. At this point the user identity is also deleted from the circuitry, ready to receive and one from the next user's mobile device.

The applications of the disclosed invention discussed above are not limited to any particular industries, but may include any number of industries and applications. Modification of the above-described methods and devices for carrying out the invention, and variations of aspects of the invention that are obvious to those of skill in the arts are intended to be within the scope of this disclosure. Moreover, various combinations of aspects between examples are also contemplated and are considered to be within the scope of this disclosure as well.

What is claimed is:

1. A method for recording take or return of multiple inventory items by one or more users, comprising:
    receiving a wireless signal from a mobile device in proximity to a short-range wireless communications device incorporated into a button module, wherein the mobile device has a predetermined and unique first identification signal and the short-range wireless communications device has a predetermined and unique second identification signal associated with the button module;
    transmitting to a remote server via the button module, a combination of the first identification signal from the mobile device, the second identification signal from the short-range wireless communications device, and a third signal indicative of an increase or decrease in inventory count,
    wherein the combination of signals is transmitted from the button module when a first button corresponding to the increase or a second button corresponding to the decrease is depressed by a user upon the button module.

2. The method of claim 1 further comprising receiving information from the remote server with respect to an item identified by the first identification signal upon the mobile device and wherein the mobile device is configured to modify information about the item.

3. The method of claim 1 where the short-range wireless communications device comprises a passive or active NFC chip.

4. The method of claim 1 where the short-range wireless communications device is connected via a wireless protocol.

5. A system for managing multiple inventory items by multiple users, comprising:
    a button module having at least a first button and a second button and a short-range wireless communications device incorporated into the button module, wherein the short-range wireless communications device has a predetermined and unique module identification signal associated with the button module and where the short-range wireless communications device is configured to activate when a mobile device is in proximity to the button module;
    a circuitry unit in communication with the short-range wireless communications device, wherein the circuitry unit is configured to transmit the module identification signal to the mobile device for combination with a predetermined and unique mobile device identification signal,
    wherein the circuitry unit is further configured to receive a count signal indicative of an increase or decrease in inventory count corresponding to the first button or the second button being depressed upon the button module and combine the count signal with the module identification signal for transmission.

6. The system of claim 5 where the short-range wireless communications device comprises a passive or active NFC chip.

7. The method of claim 5 where the short-range wireless communications device is connected via a wireless protocol.

8. A system for managing multiple inventory items by multiple users, comprising:
    a plurality of button modules each having at least a first button and a second button and a short-range wireless communications device incorporated into the button module, wherein the short-range wireless communications device has a predetermined and unique module identification signal associated with the button module and where the short-range wireless communications device is configured to activate when a mobile device is in proximity to the button module;
    a circuitry unit in each button module which is in communication with the short-range wireless communications device, wherein the circuitry unit is configured to receive a predetermined and unique mobile device identification signal from the mobile device for combination with the module identification signal from the short-range wireless communications device;
    a remote server located at a distance from the plurality of button modules, and
    wherein the circuitry unit of each button module is further configured to receive a signal indicative of an increase or decrease in inventory count corresponding to the first button or the second button being depressed upon the button module and combine the count signal with the mobile device identification signal and module identification signal for transmission to the remote server.

9. The system of claim 8 where each short-range wireless communications device comprises a passive or active NFC chip.

10. The method of claim 8 where the short-range wireless communications device is connected via a wireless protocol.

11. A method for recording multiple inventory items by one or more users, comprising:
    receiving via a mobile device a wireless signal from a short-range wireless communications device incorporated into a button module when the mobile device is positioned in proximity to the button module, wherein the short-range wireless communications device has a predetermined and unique identification signal associated with the button module;
    receiving via the mobile device information from a remote server relating to one or more items associated with the button module;
    accepting one or more changes to the information upon the mobile device by the one or more users; and
    transmitting the one or more changes from the mobile device to the remote server for updating the information stored upon the remote server.

12. The method of claim 11 where the short-range wireless communications device is a passive or active NFC chip.

13. The method of claim 11 where the short-range wireless communications device is connected via a wireless protocol.

14. A method for recording the issue of multiple inventory items in a storage facility, by multiple users, the method comprising:
a database that receives information from a wireless receiver;
an array of button modules, each with at least one button, the pressing of a button causing information to be wirelessly transmitted to the database via the wireless receiver
a short-range wireless communications device embedded within the button module with a unique, unchanging identification number, able to be activated by an energizing field from a nearby mobile device;
bringing the mobile device in close proximity to the button module to energize the short-range wireless communications device;
reading the mobile device's unique identification; and
sending that mobile device identification along with other data wirelessly to the database.

15. The method of claim 14 where the short-range wireless communications device in the button module is a passive or active NFC chip.

16. The method of claim 14 where the short-range wireless communications device in the button module is connected via a wireless protocol.

17. A system for recording the issue of multiple inventory items in a storage facility, by multiple users, the system comprising:
providing a database that can receive information from a wireless receiver;
deploying an array of button modules, each with at least one button, the pressing of a button causing information to be wirelessly transmitted to the database via the wireless receiver;
embedding a short-range wireless communications device within the button module with a unique, unchanging identification number, able to be activated by an energizing field from a nearby mobile device;
when a mobile device is brought in close proximity to the button module, energizing the short-range wireless communications device;
reading the mobile device's unique identification; and
sending that mobile device identification along with other data wirelessly to the database.

18. The system of claim 17 where the short-range wireless communications device in the button module is a passive or active NFC chip.

19. The method of claim 17 where the short-range wireless communications device is connected via a wireless protocol.

20. A method for managing information about multiple inventory items in a storage facility, the method comprising:
a database that receives information from a wireless receiver from one or more button modules;
a short-range wireless communications device embedded within the button module with a unique, unchanging identification number, able to be activated by an energizing field from a nearby mobile device and read the ID of the mobile device;
an array of button modules, each with at least one button, the pressing of which button causes information to be wirelessly transmitted to a database via the wireless receiver;
bringing a mobile device in close proximity to the button module to energize the short-range wireless communications device and read the unique identity of the button module into mobile device.

21. The method of claim 20 where the short-range wireless communications device is a passive or active NFC chip.

22. The method of claim 20 where the short-range wireless communications device is connected via a wireless protocol.

23. A method for managing information about multiple inventory items in a storage facility, the system comprising:
providing a database that receives information from a wireless receiver from one or more button modules;
embedding a short-range wireless communications device within the button module with a unique, unchanging identification number, able to be activated by an energizing field from a nearby mobile device and read the ID of the mobile device;
deploying an array of button modules, each with at least one button, the pressing of which button causes information to be wirelessly transmitted to a database via the wireless receiver; and
bringing a mobile device in close proximity to the button module to energize the short-range wireless communications device and read the unique identity of the button module into mobile device.

24. The system of claim 23 where the short-range wireless communications device is a passive or active NFC chip.

25. The method of claim 23 where the short-range wireless communications device is connected via a wireless protocol.

* * * * *